(12) United States Patent
Kluge et al.

(10) Patent No.: US 11,993,153 B2
(45) Date of Patent: May 28, 2024

(54) HYBRID DRIVE ASSEMBLY FOR A MOTOR VEHICLE

(71) Applicant: Bayerische Motoren Werke Aktiengesellschaft, Munich (DE)

(72) Inventors: Benjamin Kluge, Munich (DE); Sebastian Liebert, Unterfoehring (DE); Ulrich Ohnemus, Hattenhofen (DE); Fritz Pobitzer, Roehrmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/027,287

(22) PCT Filed: Aug. 26, 2021

(86) PCT No.: PCT/EP2021/073610
§ 371 (c)(1),
(2) Date: Mar. 20, 2023

(87) PCT Pub. No.: WO2022/063515
PCT Pub. Date: Mar. 31, 2022

(65) Prior Publication Data
US 2023/0356583 A1  Nov. 9, 2023

(30) Foreign Application Priority Data

Sep. 28, 2020  (DE) ...................... 10 2020 125 276.5

(51) Int. Cl.
*B60K 6/365* (2007.10)
*B60K 6/38* (2007.10)
(Continued)

(52) U.S. Cl.
CPC ............... *B60K 6/48* (2013.01); *B60K 6/365* (2013.01); *B60K 6/38* (2013.01); *B60K 6/547* (2013.01);
(Continued)

(58) Field of Classification Search
CPC . B60K 6/48; B60K 6/365; B60K 6/38; B60K 6/547; B60K 2006/4816; B60K 2006/4833
See application file for complete search history.

(56) References Cited

U.S. PATENT DOCUMENTS

2003/0183467 A1*  10/2003  Kozarekar ............. B60L 50/61
                                                               188/380
2004/0112654 A1   6/2004  Kozarekar et al.
(Continued)

FOREIGN PATENT DOCUMENTS

CN         106347097 A  *  1/2017  ............. B60K 17/08
DE   10 2014 018 463 A1    6/2016
(Continued)

OTHER PUBLICATIONS

International Search Report (PCT/ISA/210) issued in PCT Application No. PCT/EP2021/073610 dated Nov. 22, 2021 with English translation (five (5) pages).
(Continued)

*Primary Examiner* — Justin Holmes
(74) *Attorney, Agent, or Firm* — Crowell & Moring LLP

(57) ABSTRACT

A hybrid drive assembly includes an internal combustion engine as a first drive machine having a first drive shaft, an electromechanical energy converter as a second drive machine having a second drive shaft, a switchable traction transmission device with a first transmission input shaft selectively connected to the first drive shaft, and a second transmission input shaft connected to the second drive shaft. The traction transmission device has an input planetary gear set having at least three transmission shafts, an input sun gear shaft, an input ring gear shaft, and an input planet carrier shaft. One of which is the first transmission input shaft, with a first torsional vibration reducing device arranged between it and the first drive shaft. Another of which is the second transmission input shaft, with a second torsional vibration reducing device arranged between it and the second drive shaft.

20 Claims, 2 Drawing Sheets

(51) Int. Cl.
*B60K 6/48* (2007.10)
*B60K 6/547* (2007.10)
(52) U.S. Cl.
CPC ............... *B60K 2006/4816* (2013.01); *B60K 2006/4833* (2013.01)

(56) References Cited

U.S. PATENT DOCUMENTS

2010/0179010 A1* 7/2010 Kuzuya .................. B60K 6/365
903/910
2013/0288854 A1 10/2013 Kobayashi
2016/0144705 A1 5/2016 Park et al.
2017/0341502 A1 11/2017 Scholle et al.

FOREIGN PATENT DOCUMENTS

DE    10 2017 216 305 A1    3/2019
DE    10 2018 203 563 A1    9/2019
WO    WO-2012066680 A1 *    5/2012    ............... F16D 3/12

OTHER PUBLICATIONS

German-language Written Opinion (PCT/ISA/237) issued in PCT Application No. PCT/EP2021/073610 dated Nov. 22, 2021 (seven (7) pages).
German-language Search Report issued in German Application No. 10 2020 125 276.5 dated May 6, 2021 with partial English translation (10 pages).

* cited by examiner

HYBRID DRIVE ASSEMBLY FOR A MOTOR VEHICLE

BACKGROUND AND SUMMARY

The invention relates to a hybrid drive assembly for a motor vehicle having an internal combustion engine as a first drive machine, and an electromechanical energy converter as a second drive machine and a switchable traction gear for transmitting the drive forces of at least the first or at least the second or both drive machines to a remaining drive train. From DE 10 2014 018 463 A1, a drive apparatus for a hybrid-driven motor vehicle having two drive machines and a switchable traction gear mechanism is known.

The invention is described below with reference to use in a passenger vehicle having a hybrid drive, but this is not intended to be understood to be a limitation of the invention to such an application. In order to enable in a passenger vehicle a "great" range with a "low" vehicle weight, on the one hand, and emission-free travel, on the other hand, a hybrid drive assembly is often provided in passenger vehicles having an internal combustion engine as a first drive machine and an electromechanical energy converter as a second drive machine, wherein these at least two drive machines can be used in combination by means of a switchable traction gear or in each case alone in order to drive the motor vehicle. Furthermore, in a passenger vehicle, in particular when it has an electromechanical energy converter as a drive machine, high demands are placed on the so-called noise, vibration and harshness behavior (NVH behavior).

The invention proposes a hybrid drive assembly having operating properties which are improved compared with the prior art. This object is achieved with a hybrid drive assembly according to the first patent claim, and by a passenger vehicle having such a hybrid drive assembly. Preferred further developments of the invention are set out in the dependent patent claims.

In the context of the invention, a hybrid drive assembly is intended to be understood to be a drive assembly having an internal combustion engine as a first drive machine and an electromechanical energy converter as a second drive machine. The first drive machine has a first drive shaft, in particular for discharging a first drive power and the second drive machine has a second drive shaft, in particular for discharging or absorbing a second drive power. Preferably, the internal combustion engine is in the form of a combustion engine of the reciprocating piston construction type. In a further preferred manner, the electromechanical energy converter is in the form of an electric motor/generator. In particular, an internal combustion engine discharges drive power which is subjected to torsional vibrations and, furthermore, an electromechanical energy converter has a high mass inertia so that the combination of both places high demands on the decoupling of the vibrations in order to achieve adequate travel comfort.

In the hybrid drive assembly proposed, there is provision for the first drive machine alone, or the second drive machine alone, or both drive machines in combination, to be used to drive a motor vehicle. With such a hybrid drive assembly, extremely different operating modes are enabled. In order to enable these operating modes, a switchable traction gear device is provided, wherein the term "switchable" relates to different operating modes, but also to different gear ratios. The traction gear device can consequently be understood functionally to be a junction between the two drive machines and a remaining drive train of the motor vehicle, wherein the traction gear device in addition to the second drive machine may have additional electromechanical energy converters and at least one additional electromechanical energy converter may also be provided in this remaining motor vehicle drive train.

The traction gear device has a first gear input shaft, which in particular with regard to the transmission of drive power from the first drive machine, can be selectively connected to the first drive shaft. In the context of the present disclosure, the term "connection" is intended in this instance to be understood to be a direct connection, in which the two connected shafts are arranged concentrically with respect to each other and rotate in order to transmit power at the same speed, and also an indirect connection, in which the two shafts are connected to each other by means of a gear stage and thus rotate in order to transmit power in relation to the transmission ratio of the gear stage. The term "connectable" is further intended to be understood so that the connection (indirect or direct) can be selectively interrupted in particular by means of a clutch device, that is to say, there is no permanent connection.

Furthermore, the traction gear device has a second gear input shaft which can be permanently or selectively connected to the second drive shaft and preferably the second gear input shaft is permanently connected to the second drive shaft. The traction gear device has at least one gear output shaft, preferably the gear output shaft is connected to an axle gear mechanism or configured for power transmission to such an axle gear mechanism. In other words, this gear output shaft is configured to output drive power from at least one or from both drive machines to a remaining motor vehicle drive train. Furthermore, such a remaining motor vehicle drive train has at least one wheel drive, preferably a differential gear mechanism and more preferably at least one drive shaft. In particular, the remaining motor vehicle drive train is understood to be the portion of the motor vehicle drive train which adjoins the gear output shaft of the preferably switchable traction gear device and which functionally transmits the drive force provided by at least one of the drive machines to the driven motor vehicle axle(s) or wheel(s).

Furthermore, the switchable traction gear device is in particular in the form of an epicyclic gear device. In this instance, an epicyclic gear device is intended to be understood to be a gear device which has at least one planetary gear set, having a ring gear, a sun gear and a planetary gear carrier on which at least one planetary gear or preferably a large number of planetary gears are rotatably supported. In a further preferred manner, an epicyclic gear device has a large number of planetary gear devices of which one or more planetary gear wheel sets may be in the form of a reduced planetary gear wheel set, wherein a "reduced planetary gear wheel set" is intended to be understood to be a planetary gear wheel set which does not have one of the above-mentioned gear elements (sun gear, ring gear, planetary gear carrier). More preferably, an "epicyclic gear device" is intended to be understood to be a gear device which has exclusively planetary gear wheel sets or reduced planetary gear wheel sets for providing the switchable transmission stages. More preferably, the switchable traction gear device has a large number of switching elements, in particular brakes and clutches, which are configured to connect individual gear elements to each other or to connect gear elements to a gear housing device. Such gear devices are known in extremely varied gear mechanism topologies.

The switchable traction gear device has the so-called input planetary gear wheel set which is preferably not in the form of a reduced planetary gear wheel set, but instead of a complete planetary gear wheel set and accordingly has a sun gear or a sun gear shaft, a ring gear or a ring gear shaft and a planetary gear carrier having at least one planetary gear which is rotatably supported thereon. Consequently, the input planetary gear wheel set has at least three gear shafts, of which one is in the form of an input sun gear shaft, one in the form of an input ring gear shaft and one in the form of an input planetary gear carrier shaft. Furthermore, one of these three gear shafts (input sun gear shaft, input ring gear shaft, input planetary gear carrier shaft) is in the form of the first gear input shaft. The "first gear input shaft" is consequently intended to be understood to be the gear shaft via which drive power (speed, torque) can be supplied to the switchable traction gear device from the first drive machine. Furthermore, with regard to the transmission of torque from the first drive machine and consequently from the first drive shaft to the first gear input shaft, a first torsional vibration reduction device is arranged between the first drive shaft and the first gear input shaft. As a result of the system, the drive torque provided by the first drive machine is subjected to torsional vibrations which are reduced or eliminated by means of the first torsional vibration reduction device. Preferably, the "torsional vibration reduction device" is intended to be understood to be a single-mass or multiple-mass flywheel and more preferably a device which is provided for active or passive reduction of torsional vibrations, wherein such devices are known in different construction types from the prior art.

The invention further proposes that another of these three gear shafts (input sun gear shaft, input ring gear shaft, input planetary gear carrier shaft) of the input planetary gear wheel set is in the form of the second gear input shaft. In a case in which the input planetary gear carrier shaft is in the form of the first gear input shaft, the second gear input shaft is accordingly preferably the input ring gear shaft or preferably the input sun gear shaft. More preferably, drive power is transmitted to the gear input shafts by means of a gear device in each case. More preferably, with regard to the transmission of drive power from the second drive machine to the second gear input shaft, a second torsional vibration reduction device is arranged between the second drive shaft and the second gear input shaft. In particular, the second drive machine has a high mass inertia so that torsional vibrations which are transmitted to the switchable traction gear device in this context can lead to an unfavorable or undesirable noise vibration harshness (NVH) behavior. In order to contribute to a decoupling of the second drive machine, it is proposed to provide a second torsional vibration reduction device, wherein this device is, in the torque transmission direction from the second drive shaft to the second gear input shaft, arranged between them. In particular using such a hybrid drive assembly having two torque reduction devices, a particularly preferred NVH behavior can be achieved.

In a preferred embodiment of the invention, the first gear input shaft of the hybrid drive assembly is in the form of an input planetary gear carrier shaft, that is to say, the planetary gear carrier shaft of the input planetary gear wheel set. In particular by means of such a construction of the invention, for the first drive machine, that is to say, the internal combustion engine, an advantageous transmission range with the hybrid drive assembly is enabled.

In a preferred embodiment of the invention, the second gear input shaft of the hybrid drive assembly is in the form of an input sun gear shaft, that is to say, the sun gear shaft of the input planetary gear wheel set. In particular by means of such a construction of the invention, for the second drive machine, that is to say, the electromechanical energy converter, an advantageous transmission range with the hybrid drive assembly is enabled, in particular in combination with the first drive machine which is coupled to the first gear input shaft.

In another preferred embodiment, the second drive machine is connected with an electric machine gear stage to the second gear input shaft, therefore in particular connected thereto in order to transmit a drive power (speed, torque) and furthermore to this end it is preferably permanently connected to the second gear input shaft. As set out, the second drive machine has for discharging and absorbing drive power (speed, torque) a drive shaft, a so-called second drive shaft, which in particular in the embodiment with the electric machine gear stage is arranged in an axially parallel manner and radially spaced apart with respect to the second gear input shaft. In particular, by means of such an embodiment, a compact construction of the hybrid drive assembly is enabled since the second drive machine is thus arranged axially parallel and radially spaced apart with respect to the second gear input shaft and consequently with respect to the switchable traction gear device and, furthermore, with the electric machine gear stage, the possibility is afforded of adapting the drive power (speed, torque) which can be provided by the second drive machine to the load requirement.

In a preferred embodiment of the hybrid drive assembly, the electric machine gear stage is in the form of a gear mechanism. In particular, gear mechanisms have a high degree of efficiency and enable a high power density. More preferably, this gear mechanism has a drive gear which is connected in a rotationally secure manner to the second drive shaft, that is to say, to the drive shaft of the second drive machine. Furthermore, there is provided an intermediate gear device with which this drive gear is in engagement. In particular, an intermediate gear device enables, with little structural spatial requirement, a larger radial distance to be bridged, more preferably a plurality of intermediate gears are provided, of which at least one is in the form of an intermediate gear device, and more preferably a gear cascade-like arrangement is provided, by means of which drive power can be transmitted from this drive shaft to the second gear drive shaft. In the context of the invention, the "intermediate gear device" is intended to be understood to be an intermediate gear which has a torsional vibration reduction device, in particular therefore the second torsional vibration reduction device, and wherein in particular drive power can be transmitted by the intermediate gear device from this drive shaft to the second gear input shaft. In particular by means of a second torsional vibration reduction device, it becomes possible to isolate or reduce torsional vibrations which are brought about in particular in the switchable traction gear device or can be transmitted thereby so that they do not reach or only slightly reach the second drive machine.

In a preferred embodiment, this electric machine gear stage is in the form of a gear mechanism, as already set out above, and this gear mechanism has, in contrast to the embodiment explained above, a drive gear device which has the second torsional vibration reduction device. In contrast to the electric machine gear stage explained above, the embodiment set out here has additionally or alternatively to the intermediate gear device having a second torsional vibration reduction device the drive gear device having a second torsional vibration reduction device. In this instance, the drive gear device is arranged directly on the drive shaft of the second drive machine. More preferably, the drive gear device is consequently configured to transmit drive power (speed, torque) to the intermediate gear or directly to the second gear input shaft and is therefore preferably in engagement with a corresponding gear. More preferably, the drive power can be transmitted from the intermediate gear to the second gear input shaft. In particular, a second torsional vibration reduction device on the drive shaft of the second drive machine, thus on the drive gear device, leads to a particularly good decoupling of the second drive machine from torsional vibrations of the switchable traction gear device.

In a preferred embodiment, the electric machine gear stage is in the form of a continuously variable transmission. In particular using a continuously variable transmission, it is possible with little complexity to bridge a "large" radial distance between the drive shaft of the second drive machine and the second gear input shaft and on the whole a compact construction of the hybrid drive assembly can thus be achieved. In the context of the invention, a "continuously variable transmission" is in particular intended to be understood to be a traction gear mechanism and preferably a belt or preferably a chain gear mechanism. Preferably, the continuously variable transmission has a drive sprocket device which is preferably arranged on the drive shaft of the second drive machine or is connected thereto in a rotationally secure manner. More preferably, the drive sprocket device has the second torsional vibration reduction device and is more preferably thereby connected to the second drive shaft. More preferably, in order to transmit the drive forces (speed, torque) from the second drive machine to the second gear input shaft there is provided an electric machine wrap-around means which in particular in the case of a belt gear mechanism is in the form of a belt and which in particular in the case of a chain gear mechanism is in the form of a chain.

In a preferred embodiment, the first drive shaft is at least temporarily connected with an internal combustion engine gear stage to the first gear input shaft or can preferably be selectively connected thereto. In particular, by means of an internal combustion engine gear stage, it becomes possible for the first drive shaft to be arranged axially parallel and radially spaced apart with respect to the first gear input shaft and, furthermore, a nested construction is in particular thereby enabled, wherein the first, second drive machine and the switchable traction gear device are in each case arranged parallel and in particular in each case not concentrically with respect to each other and a compact construction of the hybrid drive assembly is thus enabled.

In a preferred embodiment, the internal combustion engine gear stage has an internal combustion engine clutch device which is arranged concentrically with respect to the first drive shaft and by means of which the power transmission, in particular speed, torque, from the first drive shaft to the first gear input shaft can be selectively interrupted. Preferably, the first torsional vibration reduction device is arranged concentrically with respect to the first drive shaft. In particular by means of such an embodiment, a mechanical separation, with respect to the transmission of drive power, from the hybrid drive assembly is enabled and an efficient operation of the hybrid drive assembly is thus enabled.

In a preferred embodiment of the hybrid drive assembly, the first torsional vibration reduction device is arranged in the torque transmission direction from the first drive shaft to the first gear input shaft upstream of the internal combustion engine clutch device. A possible source for rotational irregularities and consequently a vibration excitation source is the first drive machine in the form of an internal combustion engine. In particular by means of a first torsional vibration reduction device which is arranged as close as possible to this source, it becomes possible to decouple the remaining hybrid drive assembly from this vibration excitation source and thus to provide a particularly comfortable drive assembly.

In a preferred embodiment of the invention, the second gear input shaft can be selectively connected to a housing device, preferably connected in a rotationally secure manner, by means of a switching element which is in the form of a brake device. By means of such an embodiment of the invention, it becomes possible to stop the second drive machine, in particular when it is discharging no drive power to the hybrid drive assembly, or to predetermine the speed zero for it. Tests have shown that, with such an embodiment, a particularly efficient operation of the first drive machine is enabled via the switchable traction gear device.

In a preferred embodiment of the invention, the input ring gear shaft can be selectively connected to a housing device by means of a switching element which is in the form of a brake device. Preferably, this brake device is provided in addition to the brake device mentioned above and is consequently intended to be understood to be an additional brake device. Tests have shown that, with such a brake device, an efficient operation of the hybrid drive assembly is enabled.

Individual features and embodiments of the invention are explained in greater detail below with reference to the Figures, in this instance combinations of features and embodiments other than those illustrated are possible.

DETAILED DESCRIPTION

Figure 1:
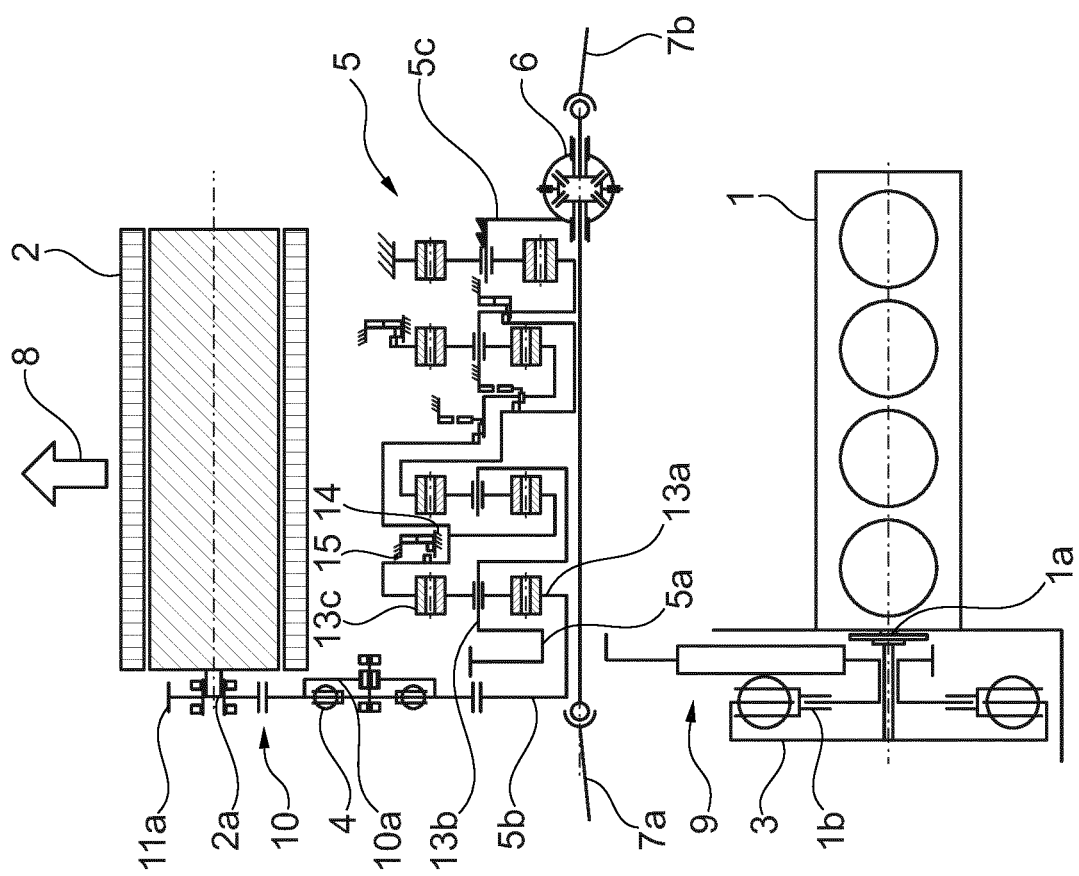
FIG. 1 shows a sectioned illustration of a hybrid drive apparatus.
Figure 2:
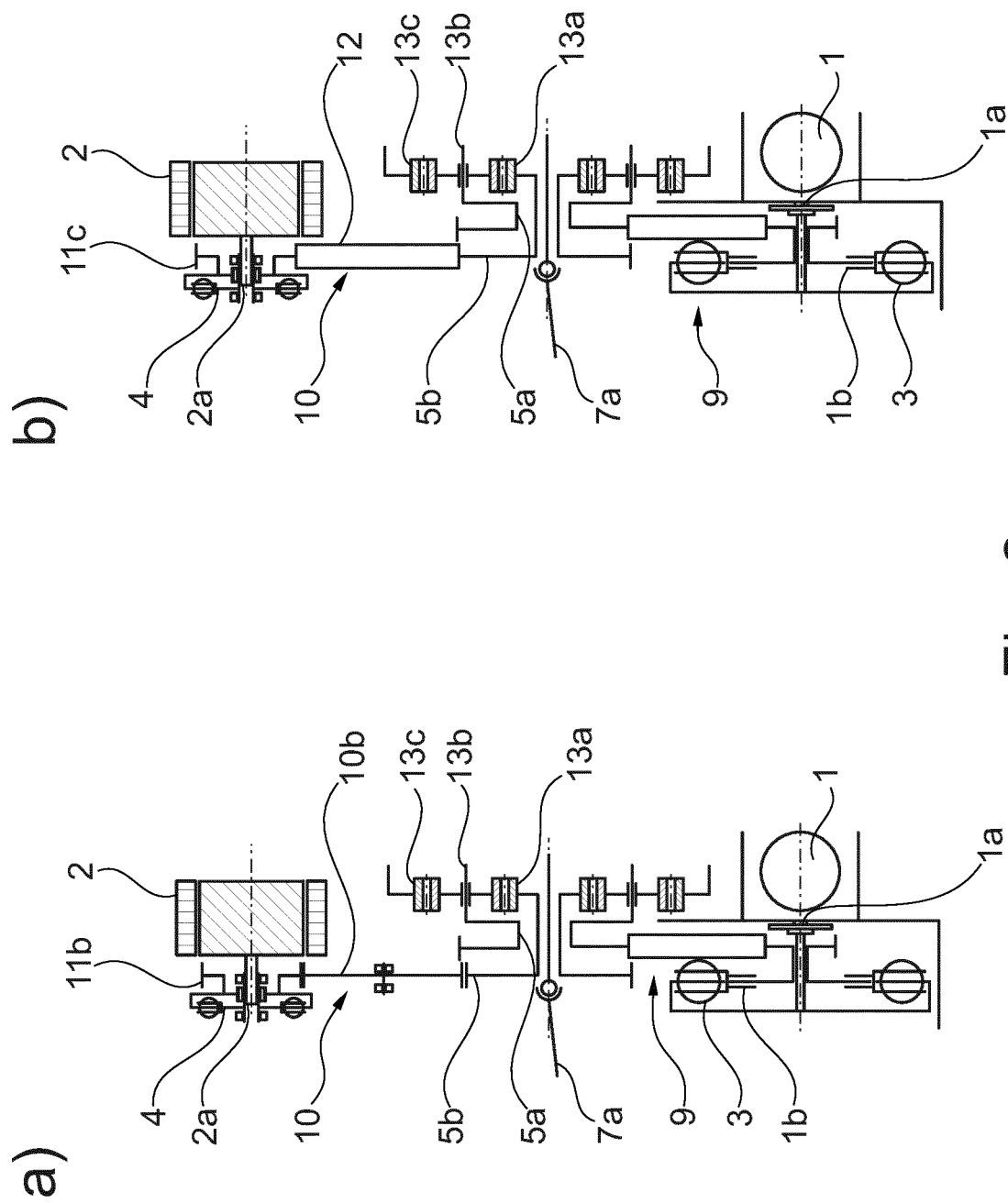
FIG. 2A and FIG. 2B show partially sectioned illustrations of two variants of the connection of the electric drive machine to the hybrid drive apparatus.

FIG. 1 is a schematic sectioned illustration of a hybrid drive apparatus. The hybrid drive apparatus illustrated has an internal combustion engine 1 as a first drive machine and an electric drive machine 2 as a second drive machine. These two drive machines can each be used individually or together to discharge drive power via the traction gear device 5 to the remaining drive train with the axle gear 6 and the left and right output shaft 7a, 7b. The traction gear device 5 is in the form of an epicyclic gear mechanism and has the input planetary gear wheel set with the input sun gear shaft 13a, the input planetary gear carrier shaft 13b and the input planetary gear carrier ring gear shaft 13c. The internal combustion engine can be selectively connected to the first gear input shaft 5a by means of the internal combustion engine clutch device 1b, furthermore, the hybrid drive apparatus has for power transmission from the internal combustion engine 1 to the traction gear device the first transverse drive 9 which is in the form of an internal combustion engine gear mechanism. In the torque transmission direction from the first drive shaft 1a to the first gear input shaft 5a, the first torsional vibration reduction device 3 is arranged between them. With the first torsional vibration reduction device 3, the torsional vibrations brought about in particular by the internal combustion engine can be reduced. The electric machine gear stage, that is to say, the second transverse drive, may contain a traction gear mechanism (embodiment, FIG. 2b) or a gear mechanism (FIGS. 1 and 2a).

The electric drive machine 2 is connected via the second transverse drive 9 which is in the form of an electric machine gear stage to the second gear input shaft 5b. In this instance, various variants are proposed for this second transverse drive (cf. FIGS. 2a, 2b).

In the embodiment illustrated in FIG. 1, an intermediate gear device 10a has the second torsional vibration reduction device 4. Furthermore, this intermediate gear device 10a meshes with the torsional vibration reduction device 4 for power transmission from the second drive shaft 2a to the drive gear 11a, which is constructed without a torsional vibration reduction device, and with a gear which is arranged on the second gear input shaft 5b.

The hybrid drive apparatus is in this instance received with so-called transverse installation in a motor vehicle, that is to say, with respect to the orientation of the first and second drive shafts 1a, 2a transversely relative to the intended forward travel direction 8 of the motor vehicle. The drive power is discharged from the traction gear device 5 by means of the gear output shaft 5c to the axle gear 6 and distributed from there over the left and right output shafts 7a, 7b which discharge the drive power to the drive wheels (not illustrated) of the motor vehicle.

The input ring gear shaft 13c can by means of the brake device 14 be selectively connected to the schematically illustrated gear housing 15 in a rotationally secure manner and consequently in particular a purely electrical travel gear (where driving is carried out exclusively via the second drive machine) is enabled.

In FIGS. 2a and 2b, different connections, in particular of the second drive machine to the traction gear, are explained below. In this instance substantially the differences with regard to the embodiment illustrated in FIG. 1 are discussed.

In FIG. 2a, an embodiment is proposed in which the second torsional vibration reduction device 4 is received directly in the drive gear device 11b having a second torsional vibration reduction device 4, the second transverse drive 10 is in this instance in the form of a gear mechanism device. This drive gear device 11b is connected to the second drive shaft 2a by means of the second torsional vibration reduction device 4. The power transmission from the electric drive machine 2 is further carried out in this instance via the intermediate gear 10b without the second torsional vibration reduction device 4 being integrated therein.

FIG. 2b illustrates an embodiment of the invention in which the electric drive machine 2 is carried out via the drive sprocket device 11c having a second torsional vibration reduction device 4. The second transverse device 10 is in this embodiment in the form of or has a traction gear mechanism, and it further contains the second torsional vibration reduction device 4. In the embodiment illustrated, the second torsional vibration reduction device 4 decouples the second drive shaft 2a from the drive sprocket device 11c having a second torsional vibration reduction device 4.

In other words, a basic principle of the invention may be to arrange a torsional vibration reduction device, preferably a torsional vibration damper, in the second gear mechanism and consequently in particular either on the second drive wheel or on the intermediate gear. The traction gear device generally has a high power density so that in particular in the wheel set provided therein for power transmission to the gear output shaft there is a shortage of structural space and it is therefore proposed to use the transverse drives to reduce torsional vibrations. In particular, the electric drive machine is coupled "directly" and consequently in a torsionally rigid manner to the gear wheel set of the traction gear device. The technical vibration configuration of the connection of the electric drive machine leads only to the introduction of selective shaft rigidities. It is therefore proposed to preferably provide a torsional vibration reduction device in the second transverse drive, such as in particular a torsional vibration damper with selectively introduced mass inertia; furthermore, rigidities via bow springs, damping actions via friction elements or shaped elastomer elements or the like as a dual mass flywheel (DMF) or clutch disc dampers are known and generally suitable.

In embodiments in which the second transverse drive has a gear drive cascade-like arrangement, the second torsional vibration reduction device may be positioned in this wheel set both on the second drive gear on the drive machine and on an intermediate gear or be integrated therein. If the second transverse drive has a traction gear mechanism or preferably a toothed chain drive, the second toothed chain drive wheel on the drive machine may have the second torsional vibration reduction device. More preferably, the second torsional vibration reduction device may be constructed with one or more bow spring channels or alternatively at least one elastomer track may be provided between the primary and secondary side of the torsional vibration reduction device. In particular by means of the second torsional vibration reduction device, a decoupling can be achieved in that it has a primary side and a secondary side which are coupled to each other in a torsionally soft and damping manner. In particular, it is proposed that the primary side and the secondary side of the second torsional vibration reduction device are supported precisely one on the other. This leads particularly to a vibration decoupling in the second torsional vibration reduction device being carried out only in a circumferential direction between the primary side and secondary side. It is further proposed to establish rigidity and damping values for the second torsional vibration reduction device experimentally or theoretically, preferably by means of a simulation.

The EM-B which is coupled to the drive axle, that is to say, will be connected in front of the FD, could also be decoupled in terms of vibration in this manner.

LIST OF REFERENCE NUMERALS

1 Internal combustion engine
1a First drive shaft
1b Internal combustion engine clutch device
2 Electric drive machine
2a Second drive shaft
3 First torsional vibration reduction device
4 Second torsional vibration reduction device
5 Traction gear device
5a First gear input shaft
5b Second gear input shaft
5c Gear output shaft
6 Axle gear
7a Left output shaft
7b Right output shaft
8 Forward travel direction
9 First transverse drive
10 Second transverse drive
10a Intermediate gear device with 4
10b Intermediate gear with 4
11a Drive gear without 4
11b Drive gear device with 4
11c Drive sprocket device with 4

12 Traction gear mechanism
13a Input planetary gear shaft
13b Input planetary gear carrier shaft
13c Input ring gear shaft
14 Brake device
15 Housing device

The invention claimed is:

1. A hybrid drive assembly comprising:
an internal combustion engine as a first drive machine, which has a first drive shaft;
an electromechanical energy converter as a second drive machine, which has a second drive shaft;
a switchable traction gear device comprising:
a first gear input shaft configured to be selectively connected to the first drive shaft;
a second gear input shaft configured to be connected to the second drive shaft; and
a gear output shaft that is configured to discharge drive power from at least one of the first drive machine or the second drive machine to a remaining motor vehicle drive train,
wherein the traction gear device is in the form of an epicyclic gear device and has an input planetary gear wheel set, wherein the input planetary gear wheel set has at least three gear shafts, of which one is in the form of an input sun gear shaft and one is in the form of an input ring gear shaft and one is in the form of an input planetary gear carrier shaft,
wherein a first one of the three gear shafts of the input planetary gear wheel set is the first gear input shaft, and wherein in a torque transmission direction from the first drive shaft to the first gear input shaft, a first torsional vibration reduction device is arranged therebetween,
wherein another of the three gear shafts of the input planetary gear wheel set is the second gear input shaft, and wherein, in a torque transmission direction from the second drive shaft to the second gear input shaft, a second torsional vibration reduction device is arranged therebetween, and
wherein the second drive shaft is connected with an electric machine gear stage to the second gear input shaft so that the second drive shaft is arranged axially parallel and radially spaced apart with respect to the second gear input shaft.

2. The hybrid drive assembly according to claim 1, wherein the first gear input shaft is an input planetary gear carrier shaft.

3. The hybrid drive assembly according to claim 2, wherein the second gear input shaft is an input sun gear shaft.

4. The hybrid drive assembly according to claim 1, wherein the second gear input shaft is an input sun gear shaft.

5. The hybrid drive assembly according to claim 1, wherein the electric machine gear stage is a gear mechanism comprising a drive gear that is connected in a rotationally secure manner to the second drive shaft and that is in engagement with an intermediate gear device that has the second torsional vibration reduction device, and wherein drive power is transmitted from the intermediate gear device to the second gear input shaft.

6. The hybrid drive assembly according to claim 1, wherein the electric machine gear stage is a gear mechanism comprising a drive gear device that has the second torsional vibration reduction device and is thereby connected to the second drive shaft, and having an intermediate gear which is in engagement with the drive gear device, and wherein drive power is transmitted from the intermediate gear to the second gear input shaft.

7. The hybrid drive assembly according to claim 1, wherein the electric machine gear stage is a traction gear mechanism and comprises a drive chain device which has the second torsional vibration reduction device and is thereby connected to the second drive shaft, and wherein electric machine traction means is provided to transmit drive forces from the second drive shaft to the second gear input shaft.

8. The hybrid drive assembly according to claim 1, wherein the first drive shaft is connected with an internal combustion engine gear stage to the first gear input shaft so that the first drive shaft is arranged axially parallel and radially spaced apart with respect to the first gear input shaft.

9. The hybrid drive assembly according to claim 8, wherein the second gear input shaft is selectively connected to a housing device via a switching element comprising a brake device.

10. The hybrid drive assembly according to claim 1, wherein the second gear input shaft is selectively connected to a housing device via a switching element comprising a brake device.

11. The hybrid drive assembly according to claim 1, wherein the input ring gear shaft is selectively connected to a housing device via a switching element comprising a brake device.

12. A hybrid drive assembly comprising:
an internal combustion engine as a first drive machine, which has a first drive shaft;
an electromechanical energy converter as a second drive machine, which has a second drive shaft;
a switchable traction gear device comprising:
a first gear input shaft configured to be selectively connected to the first drive shaft;
a second gear input shaft configured to be connected to the second drive shaft; and
a gear output shaft that is configured to discharge drive power from at least one of the first drive machine or the second drive machine to a remaining motor vehicle drive train,
wherein the traction gear device is in the form of an epicyclic gear device and has an input planetary gear wheel set, wherein the input planetary gear wheel set has at least three gear shafts, of which one is in the form of an input sun gear shaft and one is in the form of an input ring gear shaft and one is in the form of an input planetary gear carrier shaft,
wherein a first one of the three gear shafts of the input planetary gear wheel set is the first gear input shaft, and wherein in a torque transmission direction from the first drive shaft to the first gear input shaft, a first torsional vibration reduction device is arranged therebetween,
wherein another of the three gear shafts of the input planetary gear wheel set is the second gear input shaft, and wherein, in a torque transmission direction from the second drive shaft to the second gear input shaft, a second torsional vibration reduction device is arranged therebetween, and
wherein the first drive shaft is connected with an internal combustion engine gear stage to the first gear input shaft so that the first drive shaft is arranged axially parallel and radially spaced apart with respect to the first gear input shaft.

13. The hybrid drive assembly according to claim 12, wherein the internal combustion engine gear stage comprises an internal combustion engine clutch device that is arranged concentrically with respect to the first drive shaft, wherein the internal combustion engine clutch device is configured to selectively interrupt the power transmission from the first drive shaft to the first gear input shaft, and wherein the first torsional vibration reduction device is arranged concentrically with respect to the first drive shaft.

14. The hybrid drive assembly according to claim 13, wherein the first torsional vibration reduction device is arranged in a torque transmission direction from the first drive shaft to the first gear input shaft upstream of the internal combustion engine clutch device.

15. The hybrid drive assembly according to claim 12, wherein the second gear input shaft is selectively connected to a housing device via a switching element comprising a brake device.

16. The hybrid drive assembly according to claim 12, wherein the input ring gear shaft is selectively connected to a housing device via a switching element comprising a brake device.

17. The hybrid drive assembly according to claim 12, wherein the first gear input shaft is an input planetary gear carrier shaft.

18. The hybrid drive assembly according to claim 12, wherein the second gear input shaft is an input sun gear shaft.

19. A hybrid drive assembly comprising:
   an internal combustion engine as a first drive machine, which has a first drive shaft;
   an electromechanical energy converter as a second drive machine, which has a second drive shaft;
   a switchable traction gear device comprising:
      a first gear input shaft configured to be selectively connected to the first drive shaft;
      a second gear input shaft configured to be connected to the second drive shaft; and
      a gear output shaft that is configured to discharge drive power from at least one of the first drive machine or the second drive machine to a remaining motor vehicle drive train,
   wherein the traction gear device is in the form of an epicyclic gear device and has an input planetary gear wheel set, wherein the input planetary gear wheel set has at least three gear shafts, of which one is in the form of an input sun gear shaft and one is in the form of an input ring gear shaft and one is in the form of an input planetary gear carrier shaft,
   wherein a first one of the three gear shafts of the input planetary gear wheel set is the first gear input shaft, and wherein in a torque transmission direction from the first drive shaft to the first gear input shaft, a first torsional vibration reduction device is arranged therebetween,
   wherein another of the three gear shafts of the input planetary gear wheel set is the second gear input shaft, and wherein, in a torque transmission direction from the second drive shaft to the second gear input shaft, a second torsional vibration reduction device is arranged therebetween, and
   wherein the second gear input shaft is selectively connected to a housing device via a switching element comprising a brake device.

20. The hybrid drive assembly according to claim 19, wherein the input ring gear shaft is selectively connected to a housing device via a switching element comprising a brake device.

* * * * *